Patented Aug. 16, 1938

2,127,135

UNITED STATES PATENT OFFICE 2,127,135

PROCESS FOR THE POLYMERIZATION OF VINYL ESTERS AND THEIR DERIVATIVES OR HOMOLOGUES OR MIXTURES OF THESE SUBSTANCES

Hermann Plauson, Hamburg, Germany, assignor to Röhm & Haas Company, Philadelphia, Pa.

No Drawing. Original application January 30, 1931, Serial No. 512,494. Patent No. 2,086,093. Divided and this application January 4, 1935, Serial No. 358. In Germany February 1, 1930

6 Claims. (Cl. 260—2)

This invention relates to the polymerization of vinyl esters, and their derivatives or homologues or mixtures of these substances. This application is a division of Serial No. 512,494, filed January 30, 1931.

The polymerization of vinyl esters by direct heating or in the presence of catalysts requires great care; in particular it is very difficult to obtain the same degree of polymerization in successive batches because the temperature cannot be regulated uniformly throughout the mass.

According to the present invention, a process is provided by means of which an exact and easy control of polymerization of any desired degree is made possible. The process consists first in emulsifying the monomeric vinyl esters or their derivatives or homologues or mixtures of these substances by means of suitable dispersing agents and dispersion accelerators and then heating the emulsion to effect polymerization of the dispersed vinyl ester.

Various substances may be added to the vinyl esters during the course of polymerization, by means of which the polymerization of the vinyl esters is changed in different ways and special characteristics are imparted to the final products.

The process is carried out in general by emulsifying the pure vinyl ester in water by means of an emulsifying agent such as naphthene sulfonic acids (produced in the refining of mineral oils) or their soaps and then subjecting the emulsion to polymerizing influences. Only those dispersing agents are chosen which have little or no chemical action on the products of polymerization.

Various polymerization accelerators may be used including organic peroxides, aldehydes, air, oxygen, nitrogen oxides, and anhydrides of organic acids. When gaseous accelerators are employed, the product is improved with respect to both strength and elasticity.

When the desired degree of polymerization is attained, the emulsifying agent and the added substances can be removed by leaching or distilling.

The following specific examples relating to the polymerization of emulsified vinyl esters are given by way of further illustration of the invention:

*Example 1.*—500 grams vinyl acetate is emulsified in 300 to 500 grams of water to which has been added a sulphonated castor oil or its soap. This emulsion is placed in a vessel of 2 liters capacity with about 1% of an organic or inorganic superoxide and heated.

The heat of polymerization evolved is absorbed by the water, part of which is evaporated. By permitting the steam to escape the temperature may be easily controlled and an increase of the temperature to above 100° C. prevented. Any water and vinyl ester volatilized may be condensed in a reflux condenser and returned to the emulsion. The vessel in which the polymerization is carried out is equipped with a stirrer and the emulsion is kept constantly agitated.

It is thus possible to polymerize the vinyl ester to any desired degree in a simple manner. When the desired degree has been obtained, the heating is stopped. Air may be blown through the emulsion during polymerization. This exerts a favorable influence on the product and also assists in accelerating the polymerization.

Furthermore, there may be used as emulsion accelerators naphthene sulphonic acids (obtained by the refining of mineral oils), or their soaps, which in themselves react only slightly or not at all on the polymerization products. The polymerization and control of the polymerization states is accomplished as in Example 1.

There may be used as polymerization accelerators, in addition to superoxides, gaseous or vaporous substances, for example, air, oxygen, acid anhydrides, nitrogen oxides, etc. By treatment of the vinyl compounds with gaseous polymerization accelerators, it is possible to improve the elasticity of the polymerization products. Additions of acetic acid, acetals, aldehydes, etc., are permissible as polymerization improvement factors.

After the desired degree of polymerization has been reached, the emulsion medium, as well as the other added substances, may be removed by washing or distillation.

Irradiation with ultra-violet light for the purpose of accelerating the polymerization and improving the polymerizate can be used and is included in the scope of the invention.

What I claim is:—

1. The process of forming aqueous dispersions of vinyl esters which comprises emulsifying the monomeric ester in water containing an emulsifying agent which has no chemical action on the products of polymerization and subjecting the emulsion to polymerizing influences.

2. The process of forming aqueous dispersions of vinyl esters which comprises emulsifying the monomeric ester in water containing an emulsifying agent which is a member of the group consisting of naphthene sulfonic acids and their soaps and sulfonated castor oil and its soaps and subjecting the emulsion to polymerizing influences.

3. The process of forming dispersions of polymerized vinyl acetate which comprises emulsifying the monomeric vinyl acetate in water by means of an emulsifying agent that has no chemical action on the products of polymerization and subjecting the emulsion to polymerizing influences.

4. The process of forming dispersions of polymerized vinyl acetate which comprises emulsifying the monomeric vinyl acetate in water by means of an emulsifying agent which is a member of the group consisting of naphthene sulfonic acids and their soaps and sulfonated castor oil and its soaps and subjecting the emulsion to polymerizing influences.

5. The process of forming dispersions of polymerized vinyl esters which comprises emulsifying the monomeric ester in water by means of an emulsifying agent that has no chemical action on the products of polymerization and heating the emulsion to the reaction temperature.

6. The process of forming dispersions of polymerized vinyl acetate which comprises emulsifying the monomeric vinyl acetate in water by means of an emulsifying agent that has no chemical action on the products of polymerization and heating the emulsion to the reaction temperature.

HERMANN PLAUSON.